(12) United States Patent
Grover et al.

(10) Patent No.: US 12,166,769 B2
(45) Date of Patent: *Dec. 10, 2024

(54) DYNAMIC LEVEL AUTHENTICATION/ENCRYPTION

(71) Applicant: MICRO FOCUS LLC, Santa Clara, CA (US)

(72) Inventors: Douglas Max Grover, Provo, UT (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,028

(22) Filed: Sep. 7, 2023

(65) Prior Publication Data

US 2023/0421568 A1 Dec. 28, 2023

Related U.S. Application Data

(63) Continuation of application No. 17/014,120, filed on Sep. 8, 2020, now Pat. No. 11,792,204.

(51) Int. Cl.
| | | |
|---|---|---|
| *H04L 9/40* | (2022.01) | |
| *G06F 21/62* | (2013.01) | |
| *H04L 9/14* | (2006.01) | |

(52) U.S. Cl.
CPC ............ *H04L 63/105* (2013.01); *G06F 21/62* (2013.01); *H04L 9/14* (2013.01); *H04L 63/0457* (2013.01); *H04L 63/08* (2013.01)

(58) Field of Classification Search
CPC ......... H04L 9/14; H04L 63/0457; H04L 9/16; H04L 9/0894; H04L 9/088; H04L 63/105; H04L 63/08; H04L 2463/082; G06F 21/62; G06F 21/31; G06F 21/602

USPC ......................................................... 713/166
See application file for complete search history.

(56) References Cited

U.S. PATENT DOCUMENTS

| | | |
|---|---|---|
| 8,090,106 B2 | 1/2012 | Teng |
| 8,942,375 B2 | 1/2015 | Frank |
| 9,300,649 B2 | 3/2016 | Dickinson |
| 9,401,900 B2 | 7/2016 | Levasseur |
| 10,579,811 B2 | 3/2020 | Vandervort |

(Continued)

OTHER PUBLICATIONS

Author Unknown; Oasis, Key Management Interoperability Protocol Specification Version 2.1; Committee Specification 01; May 7, 2020; 230 pages.

*Primary Examiner* — Benjamin A Kaplan
(74) *Attorney, Agent, or Firm* — Sheridan Ross P.C.

(57) ABSTRACT

Results of an authentication process are received. The authentication process allows for a graded level of authentication using a plurality of authentication types (e.g., a username/password and a fingerprint scan). Encrypted data is then accessed. The encrypted data has been encrypted using a plurality of encryption levels. The data is unencrypted based on the graded level of authentication.

In a second embodiment, a system and method are provided that establish a communication session (e.g., a voice or email communication session). The communication session is between a plurality of users. During the communication session, an indication is received to change an encryption level for the communication session. In response to receiving the indication to change the encryption level for the communication session, an encryption level of the first communication session is dynamically changed from a first level of encryption to a second level of encryption.

20 Claims, 8 Drawing Sheets

(56) References Cited

U.S. PATENT DOCUMENTS

2003/0002668 A1    1/2003   Graunke
2019/0103959 A1    4/2019   Roake et al.

FIG. 8

800A (USER A)

| Index | L1 No Encryption | L2 (64 bit) | L3 (128 bit) | L4 (256 bit) | L5 (2048 bit) |
|---|---|---|---|---|---|
| 1 | | 12345678 | 12345678ABCDEF | 12345678ABCDEF123456789ABCDEF | 0 |
| 3 | | 12312355 | 12312355F234567 | 12312355F2345671231235F234567FC | 0 |
| 5 | | 23456789 | 23456789ABCDEF | 23456789423456783123456789ABCDEF | 0 |
| 7 | | 09876543 | 09876543123456 | 09876543123456784234567899ABCDEF | 0 |
| 9 | | 11763245 | 11763245A1234567 | 11763245A123456772345679ABCDEF | 0 |
| 11 | | 34125689 | 34125689C1234567 | 41256890912345677DDEE56789ABCDEF | 0 |
| 13 | | 87322456 | 8732245612345666 | 87322456123456866FDF456789ABCDEF | 0 |

800B (USER B)

| Index | L1 No Encryption | L2 (64 bit) | L3 (128 bit) | L4 (256 bit) | L5 (2048 bit) |
|---|---|---|---|---|---|
| 1 | | 87654321 | 87654321A1234567 | 87654321A12345677896567789ABCDEF | 8765432A1234567789656789ABCDEF123456789ABCDEF78... |
| 3 | | 56784321 | 56784321B1234567 | 56784321B12345671278965369ABCDEF | 9656789ABCDEF123456789ABCDEF123456789ABCDEF789... |
| 5 | | 23456789 | 23456789C234567B | 23456789C234567BAB9656789ABCDEF | 55678ABCDEF123456781156789ABCDEF123456789ABCDEF... |
| 7 | | 10987654 | 10987654212345678 | 10987654212345678CD9656789ABCDEF | 23456789ABCDEF1234567834567BABCDEF123456789ABCDE... |
| 9 | | 23456789 | 23456789423456788 | 23456789423456783123456B9ABCDEF | 2345678942123456789127856789ABCDEF123456789ABCDEF789... |
| 11 | | 01256890 | 01256890327112678 | 01256890327112678FF9656789ABCDEF | 6567B9ABCDEF12345678916656789ABCDEF123456789ABCDEF78... |
| 13 | | 97322456 | 97322456CD123123 | 97322456CD123123339656789ABCDEF | 9656789ABCDEF1234567B9ABCDEF123456789ABCDEEABCDEF78... |

800C (USER C)

| Index | L1 No Encryption | L2 (64 bit) | L3 (128 bit) | L4 (2456 bit) | L5 (2048 bit) |
|---|---|---|---|---|---|
| 1 | | 87654321 | 87654321A1234567 | 8994567B9ABCDEF12345678ABCDEF | 998A9656789ABCDEF1234567B9ABCDEF7896567B9ABCDEF... |
| 3 | | 56784321 | B1234567B9ABCDEF | CD12345678ABCDEF123456789ABCDEF | 72989ABCDEF123456789ABCDEF1234567B9ABCDEF123456789ABCDEF... |
| 5 | | 23456789 | C234567B9ABCDEF | DDEE56789ABCDEF123456789ABCDEF123 | 789ABCDEF1234567B9ABCDEF7896567B9ABCDEF123456789ABCDEF... |
| 7 | | 10987654 | 212456789A8CDEF | FFECEE5678CDEF1234567B9ABCDEF2312 | 89989ABCDEF1234567B9ABCDEF78965567B9ABCDEF123456789ABCDEF... |
| 9 | | 214567B9 | 5161237B9ABCDEF | 12345678ABCDEF | 99EE9ABCDEF1234567B9ABCDEF1234567B9ABCDEF1234567B9ABCDEF... |
| 11 | | 01256890 | 3271267B9ABCDEF | AAECE56789ABCDEF123456789ABCDEF | 89B9ABCDEF1234567B9ABCDEF1234567B9ABCDEF123456789ABCDEF... |
| 13 | | 97322456 | CD12312345670EF | ABEE56789ABCDEF1234567B9ABCDEF | 8989ABCDEF1234567B9ABCDEF7896567B9ABCDEF123456789ABCDEF7... |

DYNAMIC LEVEL AUTHENTICATION/ENCRYPTION

CROSS-REFERENCE TO RELATED APPLICATIONS

This application is a continuation of U.S. patent application Ser. No. 17/014,120, filed Sep. 8, 2020, the entirety of which is incorporated herein by reference.

FIELD

The disclosure relates generally to encryption and particularly to using encryption and/or authentication levels to dynamically access information.

BACKGROUND

Today, once a communication session is established (e.g., a voice call or email), the type and level of the communication session remains the same, regardless of the content of the communication session or who is in the communication session. For example, if a communication session is established using clear text or voice, the communication session will remain in clear text/voice regardless of whether the content or users of the communication session change. This can lead to security breaches of where a clear text/voice communication session starts and then later contains content that is sensitive.

In addition, current practices grant access to data based on a single authentication processes that then grants access based on rules. This can result in data being more vulnerable due to it not being stored securely.

SUMMARY

These and other needs are addressed by the various embodiments and configurations of the present disclosure. The present disclosure can provide a number of advantages depending on the particular configuration. These and other advantages will be readily apparent from the disclosure contained herein.

In a first embodiment, a system and method are provided that receive results of an authentication process. The authentication process allows for a graded level of authentication using a plurality of authentication types. For example, a user may first login by providing a username and password (a first level of access). The same user may later provide a fingerprint scan to get to a second level of access. Encrypted data is then accessed. The encrypted data has been encrypted using a plurality of encryption levels (e.g., Advanced Encryption Standard (AES) 64 and AES 128). Access is then granted based on the graded level of authentication. For example, in order for the user to access data encrypted using AES 64, the user will only need to provide the first level of access and for the user to access the data encrypted using AES 128, the user will have to provide both levels of authentication.

In a second embodiment, a system and method are provided that establish a communication session (e.g., a voice or email communication session). The communication session is between a plurality of users. During the communication session, an indication is received to change an encryption level for the communication session (e.g., a user selects a button to select an encryption level). In response to receiving the indication to change the encryption level for the communication session, an encryption level of the first communication session is dynamically changed from a first level of encryption to a second level of encryption (e.g., from no encryption to AES 64 or from AES 64 to AES 128).

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C. Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "encryption level" refers data that is either not encrypted (e.g., encryption level 1) or to data that is encrypted using a specific level of encryption (e.g., encryption level 2 (e.g., AES 64)). Changing an encryption level may not only refer to changing the encryption key size (e.g., from DES 64 to DES 128), but also may refer to changing the currently used encryption algorithm to a different encryption algorithm (e.g., changing from DES 64 to AES 64 or AES 128). The term "encryption levels" refers to data that is encrypted with multiple levels and/or encryption algorithms. For example, a data store may be encrypted at three levels of encryption: 1) some data with no encryption, 2) with some data that is encrypted at a first encryption level (e.g., using Data Standard Encryption (DES) 64), and 3) with some data encrypted at a second encryption level (e.g., using DES 128).

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 8 is a diagram of user key banks.

DETAILED DESCRIPTION

Figure 1:
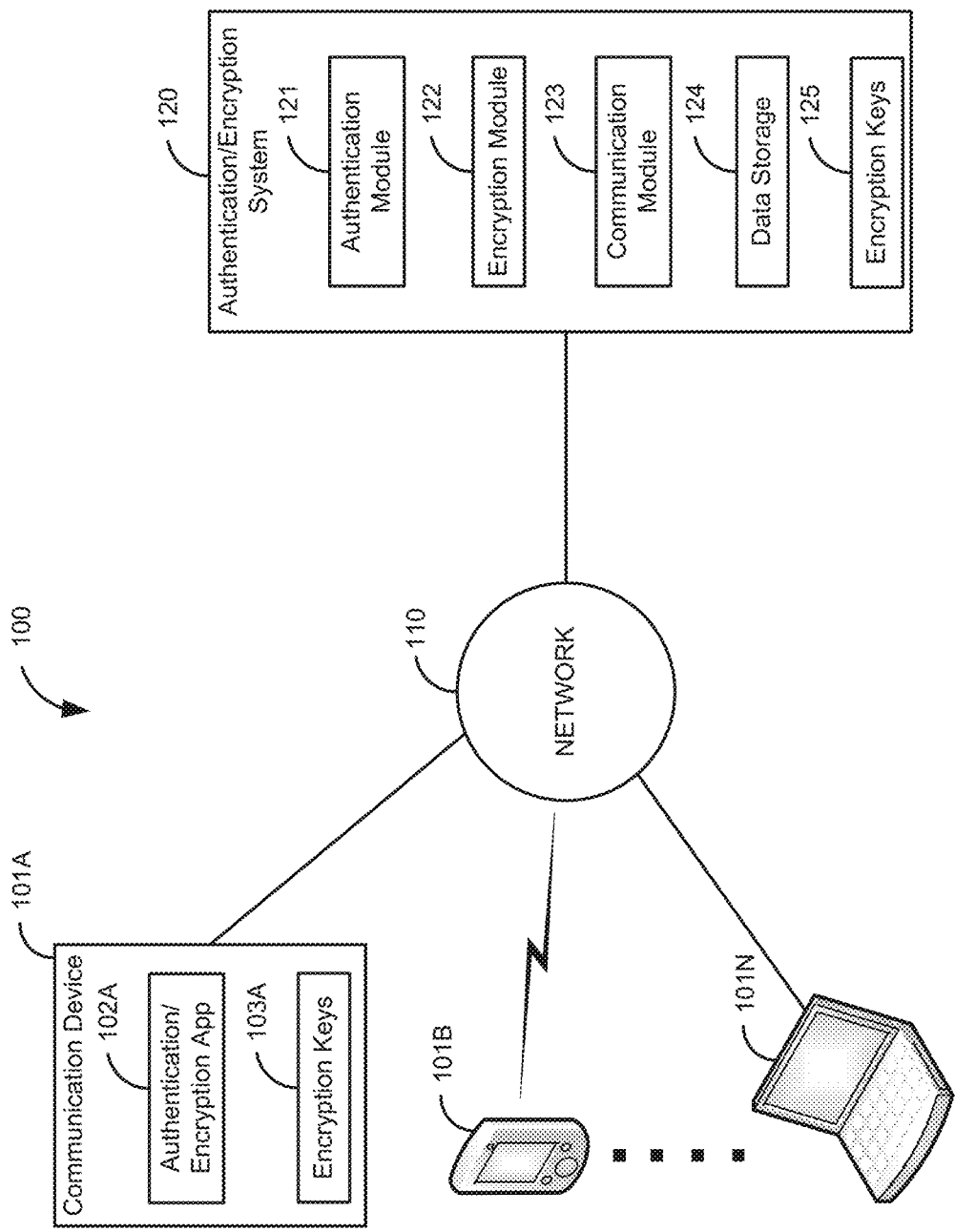
FIG. 1 is a block diagram of a first illustrative system for managing encryption levels.

FIG. 1 is a block diagram of a first illustrative system 100 for managing encryption levels. The first illustrative system 100 comprises communication devices 101A-101N, a network 110, and an authentication/encryption system 120.

The communication devices 101A-101N can be or may include any communication device 101 that can communicate on the network 110, such as a Personal Computer (PC), a telephone, a video system, a cellular telephone, a Personal Digital Assistant (PDA), a tablet device, a notebook device, a smartphone, and/or the like. The communication devices 101A-101N are devices where a communication sessions ends. The communication devices 101A-101N are not network elements that facilitate and/or relay a communication session in the network 110, such as a communication manager or router. As shown in FIG. 1, any number of communication devices 101A-101N may be connected to the network 110.

The communication device 101A further comprises an authentication/encryption application 102A and encryption keys 103A. While not shown for convenience, the communication devices 101B-101N may also comprise respective authentication/encryption applications 102B-102N and encryption keys 103B-103N. The communication devices 101A-101N may comprise other elements, such as a microprocessor, a memory, and/or the like.

The authentication/encryption application 102A provides authentication/encryption services in connection with the authentication/encryption system 120. The authentication/encryption application 102A can work in conjunction with the authentication module 121 to authenticate a user of the communication device 101A. The authentication/encryption application 102A may also encrypt/decrypt data and/or a communication session based on the encryption keys 103A.

The encryption keys 103A can be or may include encryption keys 103A in any known format (or even new formats), such as, Public-Key (PKI) encryption, AES, DES, Rivest-Shamir-Adleman (RSA), Blowfish, Twofish, and/or the like. The encryption keys 103A may be based on various key lengths, such as 64 bit, 128 bit, 256 bit, 512 bit, 1024 bit (or longer), and/or the like. The encryption keys 103A are typically exchanged from the authentication/encryption system 120 using known techniques, such as, Diffie-Hellman key exchange, PKI, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Hyper Text Markup Language (HTML), Representational State Transfer (REST), email protocols, text messaging protocols, social media protocols, and/or the like. Thus, the network 110 is an electronic communication network 110 configured to carry messages via packets and/or circuit switched communications.

The authentication/encryption system 120 is a system for providing authentication/encryption for users of the communication devices 101A-101N. The authentication/encryption system 120 comprises an authentication module 121, an encryption module 122, a communication module 123, a data storage 124, and encryption keys 125. Although not shown the authentication/encryption system 120 may comprise a microprocessor, memory, and/or the like.

The authentication module 121 provides authentication of users of the communication devices 101A-101N. The authentication module 121 can manage various types of authentication, such as, username/password, fingerprints, palm scans, voiceprints, retinal scans, face prints, and/or the like. The authentication module 121 can provide direct authentication and/or authentication based on hardware in the communication devices 101A-101N using known techniques for authentication. For example, the authentication module 121 may provide direct authentication by serving a web page where the user can provide a username/password. Alternatively, the authentication module 121 can provide authentication where the authentication module 121 works with hardware in the communication devices 101A-101N. For example, the authentication module 121 may work with a fingerprint scanner, a camera (e.g., for a face print), a retinal scanner, and/or the like in the communication devices 101A-101N to provide graded levels of authentication.

The encryption module 122 can encrypt/decrypt data and/or a communication session. For example, the encryption module 122 may encrypt/decrypt a voice or email communication session using the encryption keys 125. The encryption module 122 may work in conjunction with the authentication module 121 to encrypt/decrypt information based on a graded authentication level provided by the authentication module 121.

The communication module 123 provides access to the network 110. The communication module 123 can also provide communication services. For example the communication module 123 can be an email system, a video conferencing system, a voice conferencing system, a text messaging system, a social media network, a chat messaging system, a video streaming service, an audio streaming service, a voicemail system, and/or the like.

The data storage 124 can be or may include any type of data storage 124 for storing information, such as, a memory, a database, a flash drive, a hard disk, and/or the like. The data storage 124 may be used to store data that is encrypted using the encryption keys 125. For example, the data storage 124 may store emails, voicemails, social media postings, chat messages, text messages, videos, recordings, and/or the like.

The encryption keys 125 may comprise encryption keys 103 of various users of the communication devices 101A-101N. In addition, the encryption keys 125 can be or may include any type of encryption keys 125 described above for the encryption keys 103A. The encryption keys 125 may comprise a key bank as described in FIG. 8, a key bank as described in the Key Management Interoperability (KMIB) protocol and/or the like.

Figure 2:
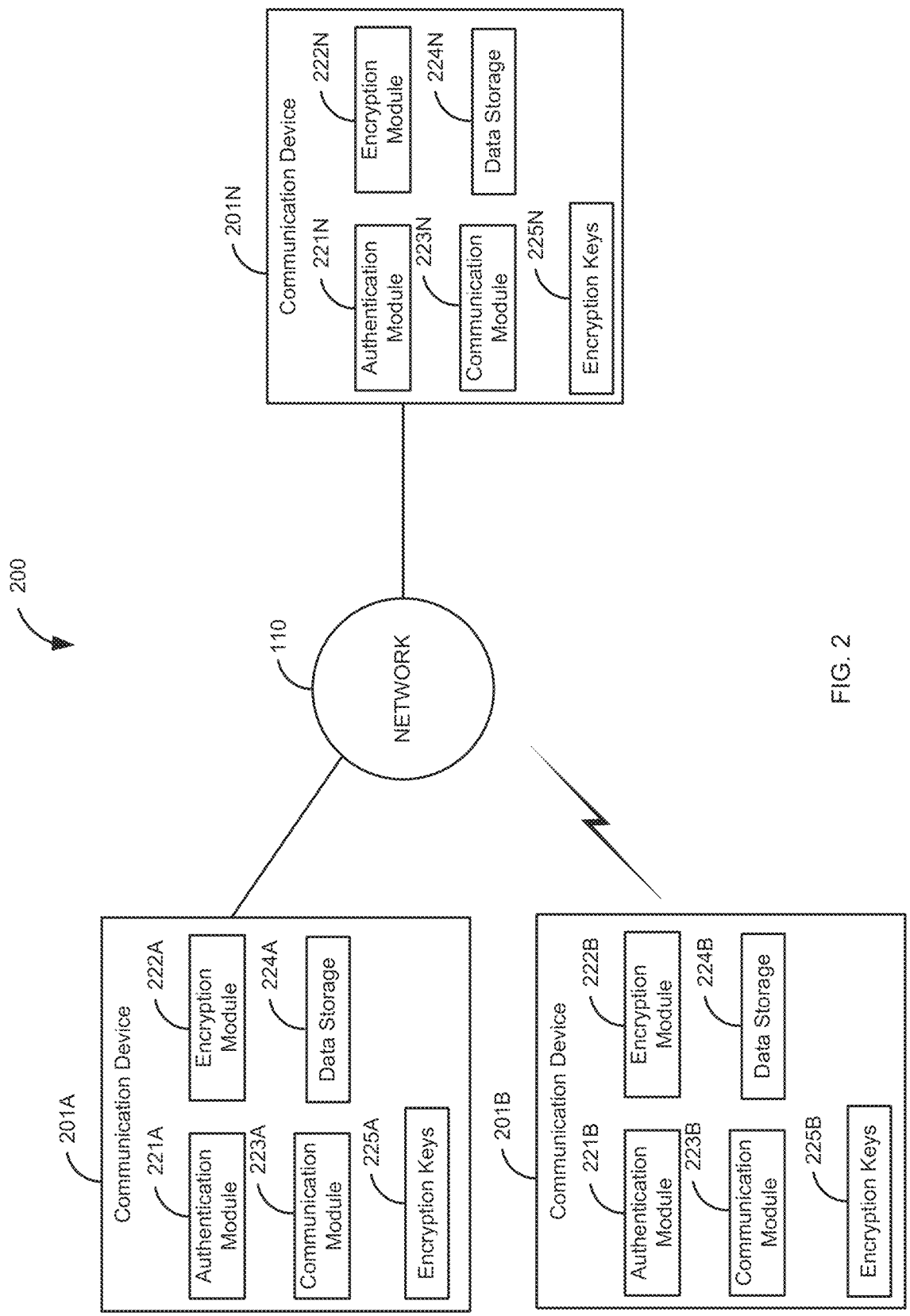
FIG. 2 is a block diagram of an illustrative peer-to-peer system for managing encryption levels.

FIG. 2 is a block diagram of an illustrative peer-to-peer system 200 for managing encryption levels. The illustrative peer-to-peer system 200 comprises communication devices 201A-201N and the network 110. In this illustrative embodiment, the communication devices 201A-201N work to provide a peer-to-peer management of encryption levels using the processes described herein.

The communication devices 201A-201N comprise authentication modules 221A-221N, encryption modules 222A-222N, communication modules 223A-223N, data storages 224A-224N, and encryption keys 225A-225N. The Authentication modules 221A-221N perform authentication of users using a graded authentication process in a similar manner to the authentication module 121 except that the authentication is done locally. The encryption modules 222A-222N work similarly to the encryption module 122 except that encryption/decryption is done in a peer-to-peer manner. The communication modules 223A-223N works similarly to the communication module 123 for establishing communication sessions. The data storage 224A-224N works similar to the data storage 124. The encryption keys 225A-225N work similar to the encryption keys 103/125 and may be a key bank as described above.

Figure 3:
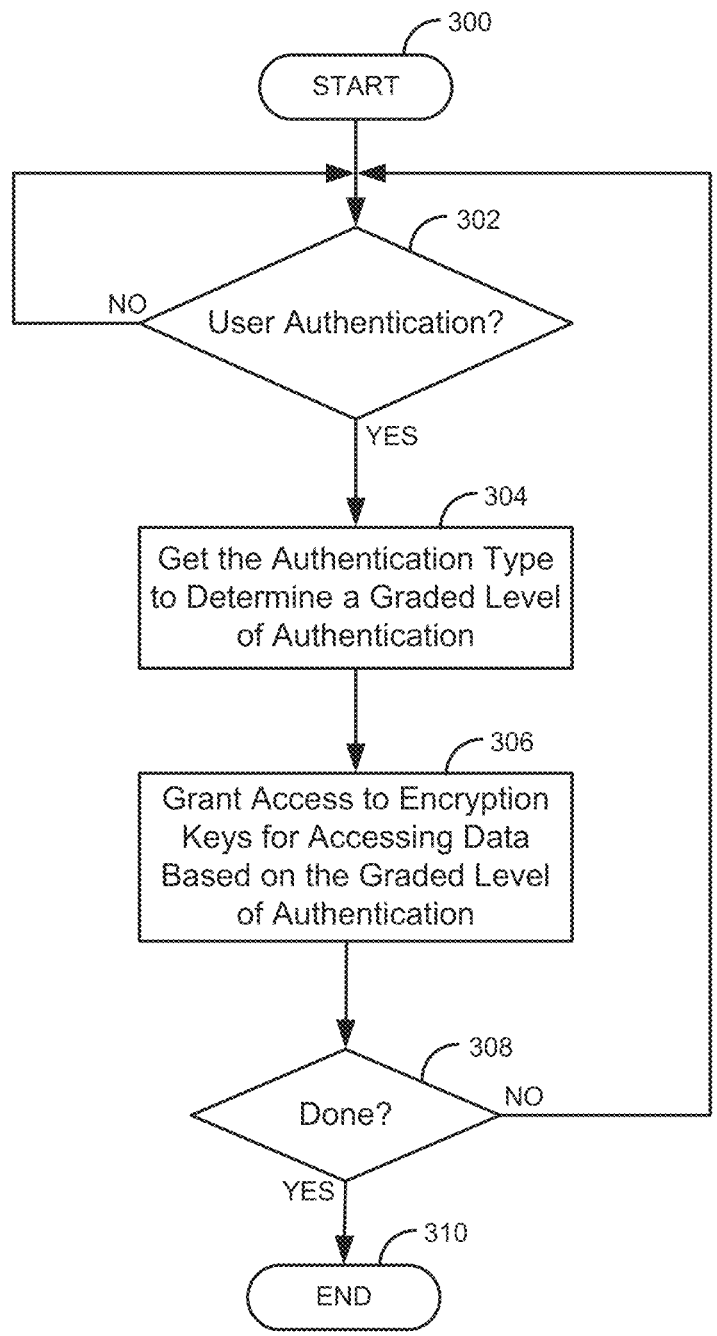
FIG. 3 is a flow diagram of a process for providing a graded level of authentication in order to access data.

FIG. 3 is a flow diagram of a process for providing a graded level of authentication in order to access data. Illustratively, the communication devices 101A-101N, the authentication/encryption system 120 and the communication devices 201A-201N are stored-program-controlled entities, such as a computer or microprocessor, which performs the methods/processes described herein by executing program instructions stored in a computer readable storage medium, such as a memory (i.e., a computer memory, a hard disk, and/or the like). Although the methods described herein are shown in a specific order, one of skill in the art would recognize that the steps in described herein may be implemented in different orders and/or be implemented in a multi-threaded environment. Moreover, various steps may be omitted or added based on implementation.

The process of FIG. 3 and the processes described herein assumes that the communication devices 101A-101N/201A-201N have access to the encryption keys 103A-103N/225A-225N. For example, the encryption keys 103A-103N/225A-225N have been previously exchanged using known key exchange techniques. The process starts in step 300. The process determines, in step 302, if a user has successfully authenticated using one or more authentication types. An authentication type can be or may include various types of authentication processes, such as, a username/password, a fingerprint, a retinal scan, a voiceprint, a facial print, a palm print, a captcha, using information that is specific to a user, learned user use patterns, and/or any known authentication technique/process. Step 302 may be implemented over time. For example, a user may first login using a username/password and then later (e.g., several hours later) authenticate using a facial print in order to have a higher level of graded access.

If the user has authenticated properly for the authentication type, in step 302, the process gets, in step 304, the authentication type in order to determine a graded level of authentication. The graded level of authentication is used to access information (e.g., a file or communication session) that has been encrypted at different levels of encryption. Based on the authentication level, the user is granted access to encryption key(s) associated with the graded level of authentication in step 306 (assuming that the user has the necessary encryption keys). The granted access may include access to unencrypted data depending on the graded access. The process determines if it is done in step 308. If the process is done in step 308, the process ends in step 310. Otherwise, the process goes back to step 302 to see if the user wants to authenticate at a higher level of authentication.

To better illustrate the process of FIG. 3, consider the following examples. In one embodiment, a user (or all the users) may actually have all the encryption keys for each encryption level. In this embodiment, access to the encryption keys are associated with a type of authentication as shown below in Table 1.

TABLE 1

| (Individual Authentication Types) | | |
|---|---|---|
| Level 1 (no encryption) | Level 2 Encryption (64 bit) | Level 3 Encryption (128 bit) |
| Username/password | Username/Password/Fingerprint scan | Username/Password/Fingerprint scan/voice print or retinal scan |

While Table 1 is an exemplary embodiment, the types of authentication required for each level may vary. For example, for level 2, instead of a fingerprint, a facial print may be used. Likewise, the type and level of encryption for each encryption level may be different. For example, level 2 encryption may be 256 bit encryption and level 3 encryption may be 512 bit encryption.

In one embodiment, a number of authentication types may be used for each authentication level as illustrated below in Table 2. Here the authentication is not limited to a specific authentication type for a specific encryption level. In this example, level 1 (no encryption) requires one authentication type, level encryption 2 requires two different authentication types, and level 3 encryption requires three different authentication types. For example, if the user can authenticate using a username/password, a voiceprint, a fingerprint, a face print, and a retinal scan, the user can use any one of the five types of authentication to get level 1 encryption access, any two of the five types of authentication to get level 2 encryption access, and any three of the five types of authentication to get level 3 encryption access.

TABLE 2

| (Number of Authentication Types) | | |
|---|---|---|
| Level 1 (no encryption) | Level 2 Encryption (64 bit) | Level 3 Encryption (128 bit) |
| One Authentication Type. | Two Authentication Types | Three Authentication Types |

In one embodiment, each authentication type is associated with a score and each authentication level has a threshold as shown below in Table 3. For example, the username/password may have a score of 5, the voiceprint has a score of 7, the face print has a score of 7, the fingerprint scan has a score of 8, and the retinal scan has a score of 10. In this example, if the user wanted to access level 2 encrypted data, the user could provide the retinal scan (score of 10) or two of the other authentication types (e.g., a username/password (score of 5) and a face print (score of 7). For the level 3 encryption, the user will have to authenticate with authentication types that have a score of 15 or higher (e.g., a face print (7) and a fingerprint (8)).

TABLE 3

| (Score of Authentication Types) | | |
|---|---|---|
| Level 1 (no encryption) | Level 2 Encryption (64 bit) | Level 3 Encryption (128 bit) |
| Threshold 5 | Threshold 10 | Threshold 15 |

The use of authentication level/encryption level could vary based on a user's security clearance/security level as shown below in Table 4. Here, User 1 has access to a higher grade of encryption with a lower level of authentication. In this example, User 2 does not have access to the highest level of encryption (level 4) because of a lower security clearance/security level.

TABLE 4

| (User Security Level) | | | | |
|---|---|---|---|---|
| User | User Security Clearance | Username/Password | Username/Password/Fingerprint scan | Username/Password/Fingerprint scan/voice print or retinal scan |
| User 1 | 1 | Level 1 (no encryption)/L2 encryption | Level 3 encryption and lower | Level 4 encryption and lower |
| User 2 | 2 (lower) | Level 1 (no encryption) | Level 2 encryption and lower | Level 3 encryption and lower |

Alternatively, the security levels may all be the same except for the last level as shown in Table 5. In this example, User 1 has access to level 4 encryption while User 2 does not.

TABLE 5

| (User Security Level) | | | | |
|---|---|---|---|---|
| User | User Security Clearance | Username/Password | Username/Password/Fingerprint scan | Username/Password/Fingerprint scan/voice print or retinal scan |
| User 1 | 1 | Level 1 (no encryption) | Level 2 encryption and lower | Level 4 encryption and lower |

TABLE 5-continued (User Security Level)

| User | User Security Clearance | Username/Password | Username/Password/Fingerprint scan | Username/Password/Fingerprint scan/voice print or retinal scan |
|---|---|---|---|---|
| User 2 | 2 (lower) | Level 1 (no encryption) | Level 2 encryption and lower | Level 3 encryption and lower |

Any of the above processes described in Tables 1-5 can be used separately or in combination as one of skill in the art would appreciate. For example, the scoring process of Table 3 could be combined with the user security levels described in Tables 4-5.

The processes described above regarding FIG. 3 can be applied to a communication session as described below in FIG. 4. If the communication session uses encryption levels 1-4 and if one of the users has only authenticated at level 1 (e.g., with a username/password that only grants access to unencrypted data), then that particular user would not be able to view/hear the encrypted portions of the communication session encrypted at authentication levels 2-4 unless the user further authenticates. If the required authentication has to be increased based on a higher level of encryption, the user could be notified that further authentication is needed in order to continue viewing/hearing the encrypted content. If the user does not have access to the necessary encryption key (e.g., is on a device that does not have biometrics or the user does not have the necessary encryption key), then the user may be given a time frame (by another user) of when the security level will drop down and the user can then hear/view the communication session. In essence, access to the user's encryption keys is based on the level of authentication.

The authentication levels may be used for accessing different elements of a database (e.g., information stored in the data storage 124). For example, a database table may have different elements that are encrypted using different encryption levels. Based on how high of a level the user has authenticated, the user will be able to access the different elements of the database. For example, the database may have the following three fields: 1 User Name (L1 encryption), Address (L2 encryption), and Social Security Number (L3 encryption). Based on the authentication level, the user will be able to access some or all of the elements of the database.

Another embodiment uses the process of FIG. 3 for a co-authored/single-authored document, for slides of a PowerPoint® presentation, for agenda items, and/or the like. Sections of the document can be encrypted/decrypted based on an authentication level. If a user has not authenticated at the highest authentication level used in the document, the user will be unable to access/edit parts of the document that are encrypted at different levels. The access can be based on tags that identify the encryption level that are stored in the document. This same process can also apply to video/voice streams (e.g., a multimedia stream/recordings, voicemails, etc.) that are generated/recorded using the above processes.

Figure 4:
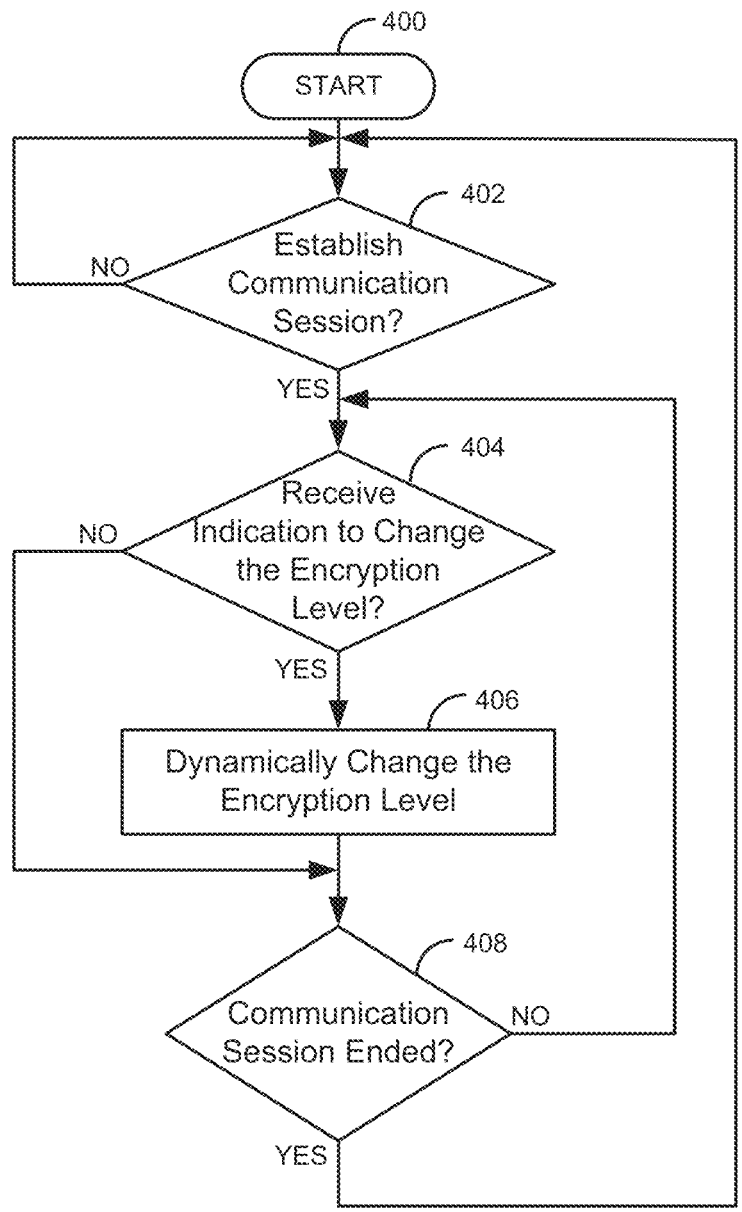
FIG. 4 is a flow diagram of a process for dynamically changing an encryption level in a communication session.

FIG. 4 is a flow diagram of a process for dynamically changing an encryption level in a communication session. The process starts in step 400. The process determines if a communication session has been established in step 402. A communication session can be any type of communication session that involves multiple users, such as a voice call, a video call, an email (e.g., an email chain), a text communication, a chat, a multimedia call (e.g., a Microsoft Teams® Meeting), a social media communication (for example, different user comments in a social media session), and/or the like. If a communication session has not been established in step 402, the process repeats step 402.

Otherwise, if a communication session has been established in step 402, the process determines if a request to change the encryption level has been received in step 404. Steps 404-408 may be based on a thread or process that monitors each communication session. There are multiple ways that a request to change the encryption level can be received during the communication session. For example, a user, via a user interface, could elect for the higher/lower level of encryption (or no encryption). The system could also dynamically look for keyword(s)/phrase(s) to initiate a change in the encryption level. For example, if a specific keyword is spoken/written/shown in an image, then the system may ask the user if the security level needs to be changed. The system could do image analysis and identify objects that are associated with a security level (e.g., a top secret plane that is being developed). Alternatively, the user could just say a known phrase to change the level. For example, the user could say "change encryption level to encryption level two" or select a button that changes the encryption level. The system can also use machine learning (where the system is trained) to look at the data being discussed and in real-time to be able to suggest to the user that they may want to dynamically change the encryption level. These processes may also be used for determining how to encrypt parts of documents/media stream as well for the process described above in FIG. 3.

If there is no indication to change the encryption level, in step 404, the process goes to step 408. Otherwise, if a request to change the encryption level has been received in step 404, the process dynamically changes the encryption in step 406. The process then determines if the communication session has ended in step 408. If the communication session has not ended in step 408, the process goes to step 404. Otherwise, if the communication session has ended in step 408, the process goes back to step 402.

Users can access the data using the process of FIG. 3 where the user has to provide the necessary level of authentication. Alternatively, the user may have access to the encrypted data based on whether the user has the proper keys to decrypt the levels of authentication.

The process of FIG. 4 provides the capability of dynamically changing the encryption level based on content of a communication session (either real-time or non-real-time). For example, for an email chain between two users, parts of the email chain may be encrypted at different levels of encryption based on the content of the email chain, which could include text of the email, embedded images, attachments, and/or the like. If the first two email messages (threads) of an email chain discussed non sensitive information (e.g., level 1 encryption (no encryption)) and the third and fourth messages and an attachment dealt with level two sensitive information, the system can encrypt the third and fourth messages/attachment using level two encryption (e.g., 64 bit encryption). Alternatively, if the attachment was level three sensitive, the attachment is encrypted at level three even though the email thread where it was attached was encrypted with level two encryption. If fifth and sixth emails of the email chain discussed level three sensitive information, then level three encryption (e.g., 128 bit encryption) is used for the fifth and sixth emails in the email thread. If the email is forwarded to a third user, the third user would have to have the 64/128 bit keys to read the full message/attachment. If the third user only had the 64 bit key (e.g., a user with a lower security clearance or who currently has not authenticated using the necessary authentication types), the third user would not be able to see the fifth and sixth emails of the email chain and possibly the attachment depending on the level of encryption. The level of encryption can change dynamically from none to low to high and then back to none in a single email thread. In this embodiment the user could set the encryption level based on the individual email/thread.

In one embodiment, a single email or single thread of a chain of emails may be encrypted using multiple encryption keys. For example, the email or thread of the email may have two paragraphs written by the same user where the one paragraph is encrypted at one level and the second paragraph is encrypted at a second level (or using no encryption). The user can have the ability to dynamically change the encryption level while typing, adding images, and/or adding attachments. For example, by clicking a button to dynamically change the encryption level while typing or adding an attachment.

If the communication session is a voice/video conference call with three or more users, the voice/video data with the levels of encryption could dynamically change based on the content of the voice/video call. For example, if the security level of the information being discussed was changed to sensitive information that requires a second level of encryption, then only the users who have access to the second level encryption key would be able to hear/see that portion of the communication session.

The dynamic encryption can be coupled with legs of the communication session/location of the device as well. For example, if User A is within a secure location/network/enterprise (e.g., a company) and the leaves the secure location/network/enterprise, then the level of encryption could dynamically change using this process. For example, when user A leaves the secure location (or switches to a mobile device) the level of encryption could dynamically change to a higher level for that leg of the communication session.

The above process can be used for text messaging/emails as well. For example, if an email that has an email chain like discussed above is forwarded outside the company, the level of encryption for each section (or some sections) may be dynamically increased a level. In this example, different users of the same email chain may have the same email encrypted at different levels of encryption based on their access location. If the same email is forwarded back to within the company, the encryptions levels may all be dynamically decreased a level.

The process of dynamically encrypting a communication session can be based on US Patent Application Publication No. 2019/0103959, which is incorporated herein by reference. In this patent application, an offset is created to identify a key version (same level/type of encryption) where the offset is hashed. Instead of using the offset to identify a key of the same level/type as described in US Patent Application Publication No. 2019/0103959, the offset identifies the encryption level and/or type of encryption and then hashes the offset in a similar manner.

In one embodiment, the process can use a key that matches the highest level of encryption and then use fragments of the key for lower level encryption as shown below in Table 6.

TABLE 6

| 64 bit key | $2^{nd}$ half of 128 bit key (64 bits) | Second half of 256 bit key (128 bytes) |
|---|---|---|
| Offset 1 | Offset 2 | Offset 3 |
| \|--------64 Bit Key----------\| | | |
| \|-------------------------128 Bit key------------------------\| | | |
| \|--------------------------------------------256 Bit Key---------------------------------------\| | | |

The process can dynamically switch encryption levels by sending blocks of data where the offset of the encryption key is in the block (e.g., at the beginning of the block). The process uses the offset as an offset to identify the key. If the offset remains the same, then the same level of encryption is used for that block. For example, for no encryption, the offset could be zero, for the 64 bit key the offset could be 64 (or it could be 1), for the 128 bit of 33 key, the offset could be 128 (or it could be 2), and for the 256 bit key, the offset could be 256 (or it could be 3). If the offset changes, then the new encryption level (or no encryption) is used. The advantage is that you do not need to redo the process of exchanging encryption keys because there is a single key that is exchanged. Moreover, the offset can be hashed, so it cannot be seen by viewing the data. This results in the change not being conveyed in an unsecure manner. Alternatively, the change does not have to be hashed (not as secure of an option).

The above process could also have separate encryption keys for each encryption level. For example, the above process can have three separate encryption keys (64 bit, 128 bit and 256 bit). In this case, the offset points to a particular encryption key as discussed above. This process can also leverage the Key Management Interoperability (KMIB) protocol (e.g., KMIB protocol 2.0, (24 Oct. 2019)) for storage of multiple encryption keys. The keys could be symmetric/PKI keys based on implementation.

Depending on the encryption level/authentication level, the key exchange process may vary. For example, if the user only has access to level one encryption, the user will only receive the 64 bit key or the first 64 bits of the 256 bit key during the key exchange process as described in the exemplary example above. If the user has full access, the user will receive all three keys (64, 128, and 256) or the full 256 bit key depending on if a single fragmented key is used. The system will look at the user's security level and then exchange the necessary key(s) to each user of the system. If authentication level is being used, then all users may receive the same encryption key(s) in the key exchange process. Alternatively, a combination of authentication level/encryption keys may be used.

The different encryption levels could use the same type of encryption (e.g., DES) or each level may use different types of encryption for each level (e.g., DES for level 1 and AES for level 2). The offset may indicate not only the key length, but also the encryption type.

The process can also dynamically add new encryption levels/encryption algorithms on the fly. For example, if the process now wanted to add 512 bit encryption for a L4 encryption level. The process can also dynamically upgrade encryption levels (e.g., using a KMIB server to provide the new keys to the necessary users). For example, if the current levels are L1 no encryption L2 64, L3 128, and L4 256, the system could dynamically upgrade to L1 no encryption, L2 128, L3 256, and L4 512 where it exchanges the new L4 512 bit key. In this scenario, the user may keep the 64 bit key in order to decode the previous L2 messages. All of this may be tied to the authentication levels as well.

Figure 5:
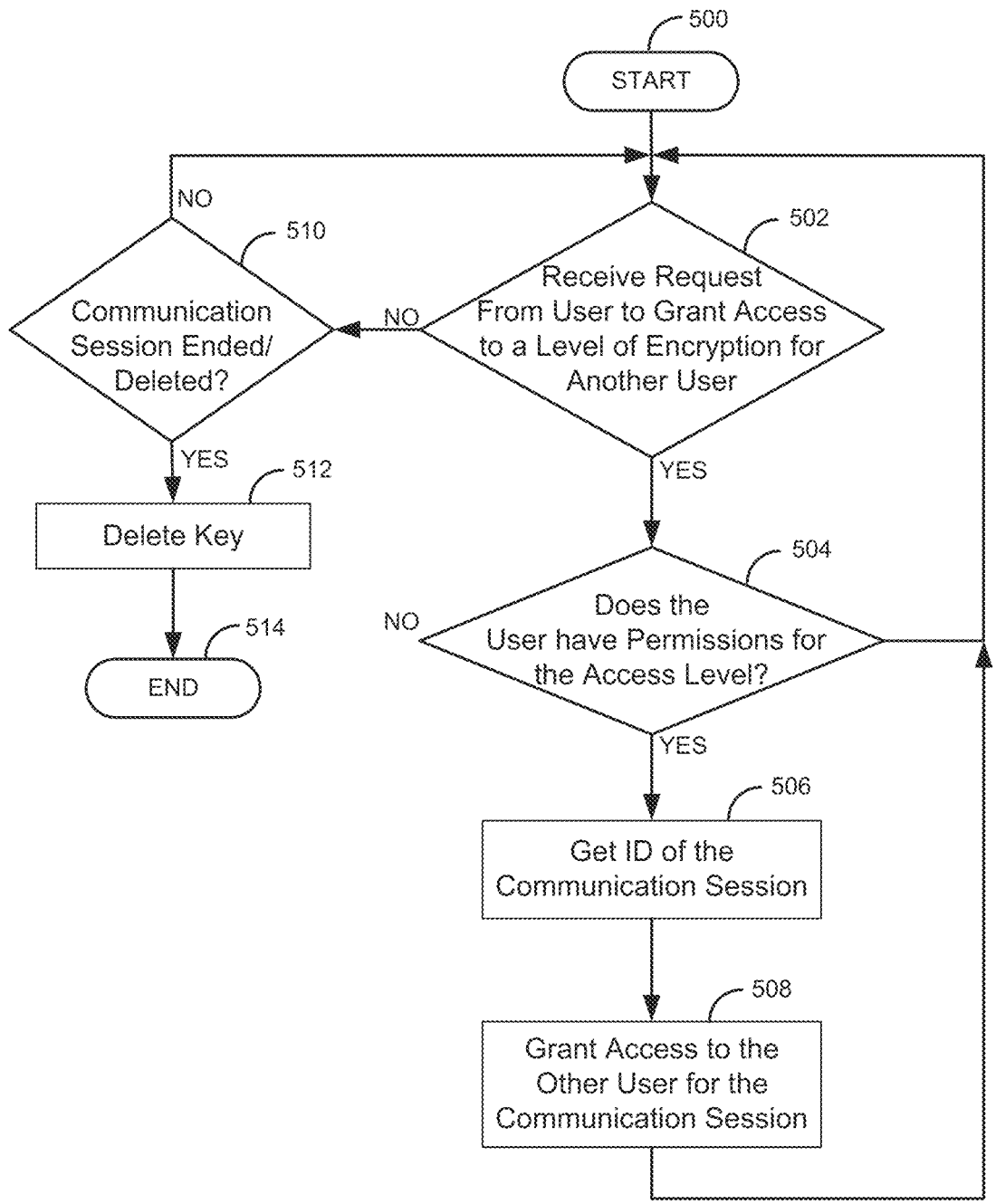
FIG. 5 is a flow diagram of a process for granting access to a level of encryption for a communication session.

FIG. 5 is a flow diagram of a process for granting access to a level of encryption for a communication session. The process starts in step 500. The process determines, in step 502, if a request has been received, from a user, to grant access to a level of encryption to another user. If access has not been requested, in step 502, the process determines, in step 510, if the communication session has ended (e.g., for a voice call or video call) or has been deleted (e.g., for an email chain or other text communication). If the communication session has ended/deleted in step 510, the process deletes the encryption key in step 512 for the other user. The process then ends in step 514. Otherwise, if the communication session has not ended/deleted in step 510, the process goes back to step 502.

Otherwise, if a request to grant access to a level of encryption for another user has been received, in step 502, the process determines, in step 504, if the user has permissions for the access level (e.g., has an encryption key for that level of encryption). If the user does not have the permissions in step 504, the process goes back to step 502.

Otherwise, if the user does have permissions in step 504, the process gets, in step 506, the identifier for the communication session. The identifier of the session can be a number/identifier that is unique for each communication session. The process then grants access to the other user for the communication session, in step 508, by granting access to a temporary encryption key. The temporary key allows the other user to access that specific level (and all levels below) of encryption in the communication session. The process then goes back to step 502.

To illustrate the process of FIG. 5, consider the following examples. A first user with a higher level key (e.g., L3 encryption) sends a request to grant access to a second user with a lower level access (e.g., where the second user only has L2 access and lower) by providing a single use L3 key that is tied to the communication session. The second user can only use the single use L3 key for that specific communication session. If a new communication session is started (of the same type/different type/same user/different users), the second user will be unable to access any L3 encrypted data in those communication sessions. The single use L3 key may have an expiration period. In this example, once the single use L3 key expires, the second user will no longer be able to access the L3 encrypted data in the original communication session and the single use L3 key may be deleted. If the original communication session ends (e.g., a voice call) or is deleted (e.g., the email chain is deleted), the single use key may also deleted. The single use key could be granted from a GUI and/or using voice commands.

The single use encryption key can be applied to documents/records as well. For example, the single use key can be granted for the second user to access sections of a document in a similar manner as described above for a communication session. Here the access is for a specific document. Likewise, the same process can be applied to a database record or object (e.g., a table or object in the table). The second user can be granted a single use key to access L3 encrypted portions of the record or object. In this example, instead of the single access key being based on a communication session, here the single use key is based on a single database record or object (e.g., a database record for user X or a specific database table or object).

Figure 6:
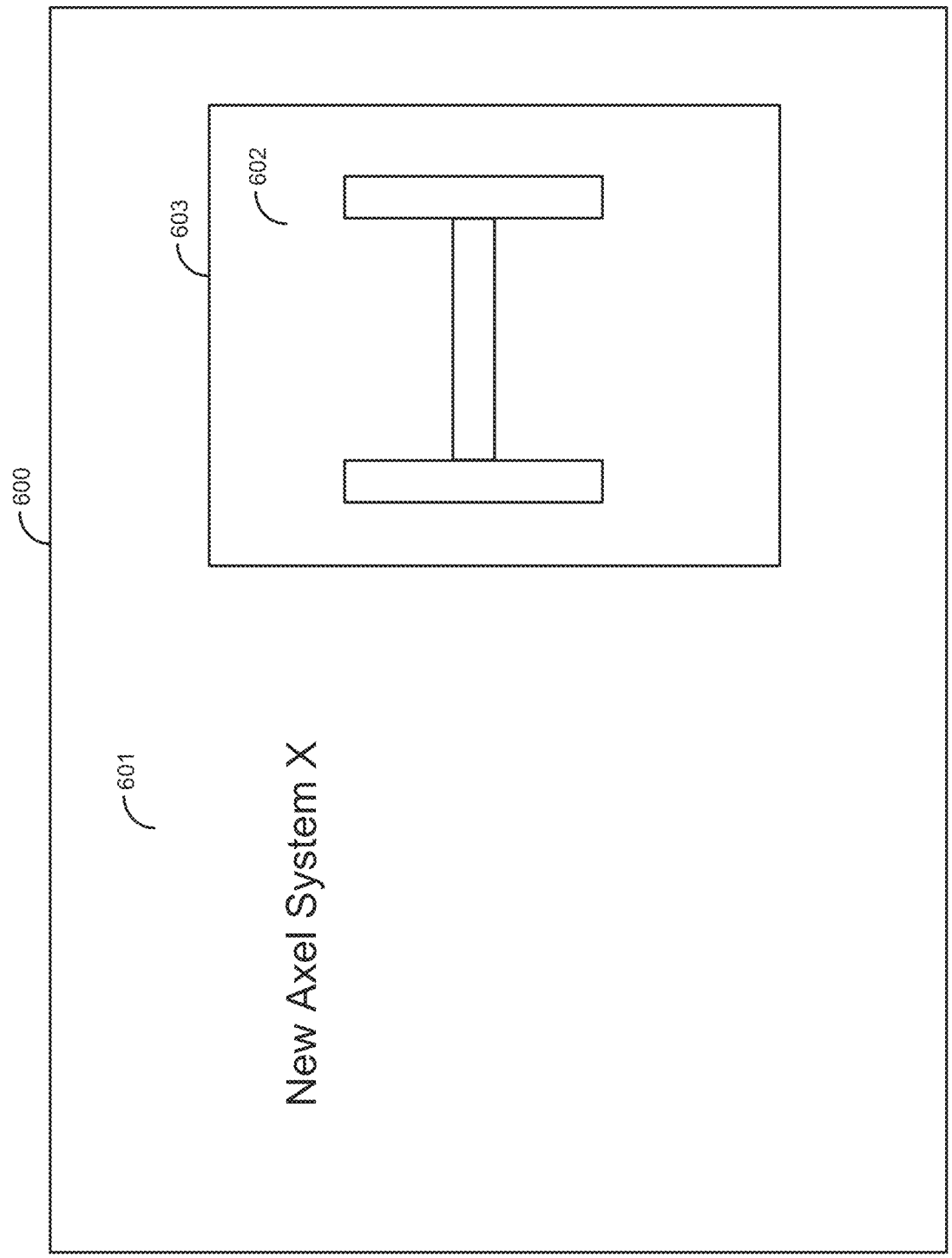
FIG. 6 is diagram that shows a video image/stream where multiple levels of encryption are used in the same video image/stream concurrently.

FIG. 6 is diagram that shows a video image/stream 600 where multiple levels of encryption are used in the same video image/stream 600 concurrently. The video image/stream 600 comprises a first area/portion 601, a second area/portion 602, and a boarder 603 that is around the second area/portion 602. In a video communication session/stream, there may be portions of what is being displayed that are encrypted using different encryption levels based on the content of the image/stream 600. For example, an embedded image (the image in the second area/portion 602), may be encrypted using a higher/lower level of encryption in relation to the rest of the video image/stream (the first area/portion 601). This could apply to the situation where a user is displaying a document in a video conference. The document (e.g., as shown in the second area/portion 602) may have been previously encrypted using first encryption level in its native format (e.g., Microsoft Word®). In this example, the first encryption level may be associated with an area or pixels of the displayed image/stream (the data within border 603). In one embodiment, there is metadata that identifies the encryption level associated with the area/pixels when the document is displayed in the second area/portion 602. For example, if there is a video communication session and an encrypted document is displayed as shown in FIG. 6, the system can send the data in the in the first area 601 at the first encryption level and the data in the second area 602 at a second encryption level. In other words, there may be multiple encryption keys used concurrently in the same video stream to encrypt different portions of what is displayed. The user receiving the video stream would have to have both keys to view the full video stream.

For documents, that are initially stored with multiple encryption levels, the system can incorporate the encryption levels into a video steam in a communication session; this is done by transferring the encryption levels of different portions of a document to a streamed encryption level. For example, a PowerPoint presentation may have individual slides that are encrypted using different encryption levels or a Word document may have sections that are encrypted using different encryption keys. These documents originally are in their native format where the encrypted data is tagged. For the video conference, the system unencrypts the data in the document and then encrypts the image area/portion on the display according to the encryption levels of the document. Once the area of the encrypted data is determined, the system then stores tags that define the area (e.g., the data within border 603) and encrypts that portion of the video stream. Likewise, the remaining data will be encrypted using the set encryption level. If the document is displaying data (the second area/portion 602) that was originally encrypted using two or more encryption keys, the system will create multiple areas that are associated with corresponding encryption levels.

One method to do this where the area/portion 601 is a first overlay that is encrypted at one encryption level of encryption and the second area/portion 602 is a second overly that is encrypted at a second level of encryption. In this example, the second overlay is displayed on top of the first overlay. This way, both overlays are then encrypted and sent as part of the media stream along with metadata that allows the receiver to decrypt and display the two overlays. In this example, the metadata identifies that the first overlay covers the whole screen and is encrypted at encryption level X. The metadata identifies that the second overlay goes on top of the first overlay and is located according to the border 603 using encryption level Y. In this example, there may be two separate video streams that use the two encryption levels that are then combined to display the video image/stream 600.

Figure 7:
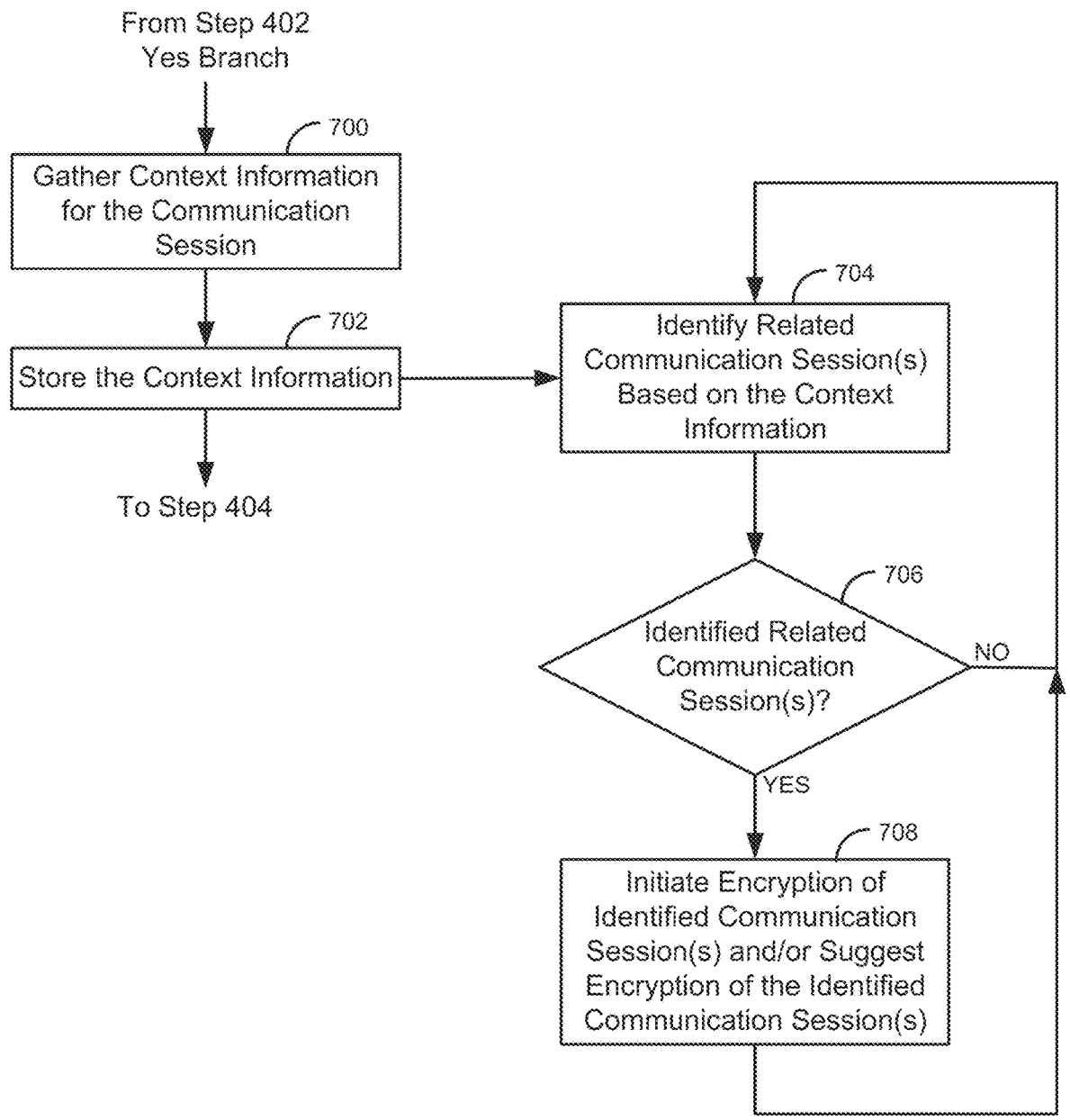
FIG. 7 is a flow diagram of a process for identifying related communication session(s) in order to provide/recommend encryption for the related communication session(s).

FIG. 7 is a flow diagram of a process for identifying related communication session(s) in order to provide/recommend encryption for the related communication session(s). The process of steps 700-702 go between steps 402 and 404 of FIG. 4. After the communication session has been established in step 402, the process gathers context information for the communication session in step 700. Context information can include various information associated with the communication session, such as, a key word, a key phrase, information in an image, information in a document, a selection of a button, machine learning, a location of a communication device 101/201 involved in the first communication session, an access location of the communication device 101/201 involved in the first communication session, participants in the communication session, a time of day, the type of encryption used in the communication session, location(s) of the participants, documents used in the communication session, the type of communication session, identifying similarities of key words in the communication sessions, and/or the like. The context information is then stored in step 702. The process then goes to step 404.

The stored context information is then used as an input to identify related communication sessions in step 704. This may be based on the start of a related communication session or during the related communication session. If any related communication session(s) have not been identified in step 706, the process goes back to step 704. Otherwise, if a related communication session(s) has been identified in step 706, the process initiates encryption of the identified communication session(s) and/or suggests encryption of the identified communication sessions based on the context in step 708. The process then goes back to step 704.

To better illustrate the process of FIG. 7, consider the following examples. User A sends an email to user B at encryption level 2. Immediately after opening the email, user B initiates a voice call to user A. Based on the context of making the voice call right after receive the level 2 encrypted email, the system may suggest to user B when making the voice call to use level 2 encryption based on the encrypted email. The process can work by identifying similarities of key words in the different types of communication sessions. For example, if previous emails that discuss project X use level 2 encryption, if the user now is opening a chat (or a new email) where the user asks a question about project X, the system may suggest that the user use level 2 encryption in the chat/new email before the user sends the new chat/email.

FIG. 8 is a diagram of user key banks 800A-800C. In this exemplary embodiment, User A has key bank 800A, User B has key bank 800B, and User C has key bank 800C. The key banks 800A-800C may be provided using various protocols, such as KMIB. In this example, the following attributes apply:

The order of the keys for individual users are not the same
The key lengths can vary between keys
Each key is in a different key slot. (Key slots can consist of index, key space size, and key)
Users will never have all the same keys
Some keys may be fragmented keys like discussed above in Table 6 while other keys may not be fragmented.
Some keys in a key bank may be disjointed (i.e. not follow the attribute above).
Keys can be matched between participant and recipients as part of a key negotiation process prior to or when establishing a communication session or accessing documents.
A nonce can be transmitted and a hash of the nonce and proposed key and other material (e.g., key size) is presented to a recipient.
The recipient hashes the nonce and keys in their key bank 600 and other material (e.g., key size) to compare against what was presented.
When matched, the user responds to the message with a new nonce (Nn) encrypted with the original nonce (No) and everything encrypted with the matched key (Km) i.e.: Km[No[Nn]].

The process occurs for each participant in the communication session. Note that the keys can be a fragmented or split to create smaller keys or combined to create larger keys. The keys can also have an offset index into them to be used as a smaller key. This can be transmitted as part of the key negotiation process. A key length can also be transmitted to cut down on the key search space if needed.

With this process in mind, consider the following illustrative example. User A wants to talk with Users B and C. User A would have to send to Users B and C a nonce/hash [Nonce, key]. User A may have the key while Users B and D do not. In this example, User A would send Users B and C a new key set from key bank 800A until there is a match. If there was not a match at that key size, User A may consider that User A and user B are in the same department, Users B and C have access to corporate secrets, and User C is in a different department and sometimes needs to talk to Users A and B.

In this scenario, for User A to talk with User B for non-secure communications (L1 no encryption) no keys are needed. For scenario 2, for User A to talk to User B about more secure information using level 2 encryption they would need to have a common L2 encryption key. In this example, User A and User B have a common L2 encryption key (Index 5, L2 in key bank 800A (I5-L2-800A) and Index 9, L2 in key bank 800B (I9-L2-800B)). When User A wants to talk to User B, once the communication session is established, User A knows he/she will need I5-L2-800A and User B knows that for this communication session encryption key I9-L2-800B is needed. Note that in this exemplary embodiment, User A cannot talk L3 (128 bit) or L4 (256) to User B as no common keys exist. Also, User A cannot talk L5 as User A is not authorized (i.e. does not have any L5 encryption keys).

For scenario 2, if User A wants to talk to Users B and C, User A can talk to User B using 64 bit encryption keys (I5-L2-800A) and (I9-L2-800B), however User A and User C have no common L2 (64 bit) encryption keys, but they do have a common encryption key. User A can talk to User C using L3 encryption keys I9-L4-800A (the first 128 of the 256 bit key are a fragment) and I1-L3-800C.

For scenario 3, during the communication session, User B needs to give User C information that User A should not have, they can exchange the information using the keys located at I7-L5-800B and I5-L5-800C (highlighted) respectively.

If a key match doesn't occur at a certain level the communication session can be upgraded to use a higher encryption key. For example, from L2 to L3 encryption.

As described herein, the key lengths are for purely illustrative purposes and can be any key length. For example, using longer keys will reduce the potential impact of superset keys to reduce a key space reduction attack. In addition, the use of public key groups can be used. For example, the process can easily encrypt to a group level (e.g., for a department). The process can then control access to the corresponding private keys via the authentication level at the key server. Another option can be to use a smaller number of bits which are used to initialize a Key Derivation Function (KDF see NIST's SP 800-108, e.g.). The process then gets the desired number of bits from the KDF. By using a modest number of bits in this way, the process can easily extend the idea to getting as many different keys as need. All that is needed is to just pull more values from the KDF.

The above embodiments are described using specific encryption levels (e.g., 64 bit, 128 bit, 256 bit, 512 bit, 1024 bit, etc.). However, the idea is not limited to specific encryption levels. For example, the encryption levels may use any number of bits. Moreover, this mechanism can be used for protection of data including documents, email, text, chat, social media, voice, video, and/or the like. In another embodiment, the basic concept is that sections of the document/communication session can be encrypted so that users in the communication session or who are viewing a document may only see what they are authorized to see using a key bank 800.

The processes described herein are processes where encryption levels are dynamically changed using different encryption keys/encryption algorithms. While the examples are shown with 64 bits and higher, they would normally have significantly higher bit levels than 64 bits. Today's encryption cannot be done practically by a person (e.g., mentally or using a pen and paper) because of the immense encryption and decryption processing requirements to transform the information dynamically during a communication session or while fetching stored data. If manual processes were used, it would typically take years to dynamically encrypt/decrypt a communication session and/or retrieve data from a document/database; this drives the requirements for the invention described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
grant to a plurality of users access to a first level of encryption;
receive a request from a first user of the plurality of users to grant to a second user of the plurality of users access to a second level of encryption, wherein the second level of encryption is higher than the first level of encryption and wherein a second user of the plurality of users does not have access to an encryption key to decrypt the second level of encryption;
determine whether the first user has permission to access the second level of encryption; and
in response to determining that the first user has permission to access the second level of encryption, grant to the second user access to the second level of encryption, wherein the access is only granted for a period of time.

2. The system of claim 1, wherein the first level of encryption is used to encrypt a first email message in an email thread and the second level of encryption is used to encrypt a second email message in the email thread.

3. The system of claim 1, wherein the first level of encryption is used to encrypt an email thread and the second level of encryption is used to encrypt an attachment to the email thread.

4. The system of claim 1, wherein the first level of encryption is used to encrypt a first portion of a document and the second level of encryption is used to encrypt a second portion of the document.

5. The system of claim 1, wherein the first level of encryption encrypts a first portion of a communication session between the first user and the second user and the second level of encryption is used to encrypt a second portion of the communication session.

6. The system of claim 5, wherein the communication session is a text-based communication session.

7. The system of claim 5, wherein the communication session is a video communication session.

8. The system of claim 1, wherein the first level of encryption and the second level of encryption are based on a plurality of key banks of encryption keys that are different for users of the plurality of users.

9. The system of claim 1, wherein the first level of encryption and the second level of encryption are based on a fragmented encryption key.

10. A method comprising:
granting, by a microprocessor, to a plurality of users, access to a first level of encryption;
receiving, by the microprocessor, a request from a first user of the plurality of users to grant to a second user of the plurality of users access to a second level of encryption, wherein the second level of encryption is higher than the first level of encryption and wherein a second user of the plurality of users does not have access to an encryption key to decrypt the second level of encryption;
determining, by the microprocessor, whether the first user has permission to access the second level of encryption; and
in response to determining that the first user has permission to access the second level of encryption, granting, by the microprocessor, to the second user, access to the second level of encryption, wherein the access is only granted for a period of time.

11. The method of claim 10, wherein the first level of encryption is used to encrypt a first email message in an email thread and the second level of encryption is used to encrypt a second email message in the email thread.

12. The method of claim 10, wherein the first level of encryption is used to encrypt an email thread and the second level of encryption is used to encrypt an attachment to the email thread.

13. The method of claim 10, wherein the first level of encryption is used to encrypt a first portion of a document and the second level of encryption is used to encrypt a second portion of the document.

14. The method of claim 10, wherein the first level of encryption encrypts a first portion of a communication session between the first user and the second user and the second level of encryption is used to encrypt a second portion of the communication session.

15. The method of claim 10, wherein the first level of encryption and the second level of encryption are based on a plurality of key banks of encryption keys that are different for users of the plurality of users.

16. The method of claim 10, wherein the first level of encryption and the second level of encryption are based on a fragmented encryption key.

17. A non-transitory, computer-readable medium comprising a set of instructions stored therein which, when executed by a processor, causes the processor to:
grant to a plurality of users access to a first level of encryption;
receive a request from a first user of the plurality of users to grant to a second user of the plurality of users access to a second level of encryption, wherein the second level of encryption is higher than the first level of encryption and wherein a second user of the plurality of users does not have access to an encryption key to decrypt the second level of encryption;
determine whether the first user has permission to access the second level of encryption; and
in response to determining the first user has permission to access the second level of encryption, grant to the second user access to the second level of encryption, wherein the access is only granted for a period of time.

18. The non-transitory, computer-readable medium of claim 17, wherein the first level of encryption is used to encrypt a first portion of an email thread and the second level of encryption is used to encrypt a second portion of the email thread.

19. The non-transitory, computer-readable medium of claim 17, wherein the first level of encryption is used to encrypt a first portion of a document and the second level of encryption is used to encrypt a second portion of the document.

20. The non-transitory, computer-readable medium of claim 17, wherein the first level of encryption encrypts a first portion of a communication session between the first user and the second user and the second level of encryption is used to encrypt a second portion of the communication session.

* * * * *